(12) United States Patent
Nagai

(10) Patent No.: US 7,079,842 B2
(45) Date of Patent: Jul. 18, 2006

(54) MOBILE TERMINAL AND HAND-OVER SOLVING METHOD

(75) Inventor: Hiroto Nagai, Tokyo (JP)

(73) Assignee: NEC Corporation, Tokyo (JP)

( * ) Notice: Subject to any disclaimer, the term of this patent is extended or adjusted under 35 U.S.C. 154(b) by 153 days.

(21) Appl. No.: 10/802,775

(22) Filed: Mar. 18, 2004

(65) Prior Publication Data
US 2004/0185851 A1 Sep. 23, 2004

(30) Foreign Application Priority Data
Mar. 19, 2003 (JP) ............................. 2003-075592

(51) Int. Cl.
H04Q 7/20 (2006.01)

(52) U.S. Cl. ...................... 455/437; 455/434; 455/574; 455/435.1; 370/331

(58) Field of Classification Search ................ 455/436, 455/437, 439, 442, 442.1, 434, 574, 435.1; 370/331
See application file for complete search history.

(56) References Cited

U.S. PATENT DOCUMENTS

| | | | | |
|---|---|---|---|---|
| 5,448,750 A | * | 9/1995 | Eriksson et al. | 455/452.2 |
| 5,530,693 A | * | 6/1996 | Averbuch et al. | 370/331 |
| 5,898,730 A | * | 4/1999 | Hensley et al. | 375/224 |
| 6,052,598 A | * | 4/2000 | Rudrapatna et al. | 455/456.1 |
| 6,125,278 A | * | 9/2000 | Wieczorek et al. | 455/437 |
| 6,385,454 B1 | * | 5/2002 | Bahl et al. | 455/450 |
| 6,442,151 B1 | * | 8/2002 | H'mimy et al. | 370/333 |
| 6,473,614 B1 | * | 10/2002 | Quensel et al. | 455/436 |
| 6,711,415 B1 | * | 3/2004 | McCarthy | 455/522 |

FOREIGN PATENT DOCUMENTS

| | | |
|---|---|---|
| JP | 2000-209630 | 7/2000 |
| JP | 2001-119742 | 4/2001 |
| JP | 2001-507539 | 6/2001 |
| JP | 2002-501684 | 1/2002 |
| JP | 2002-232928 | 8/2002 |
| JP | 2002-232929 | 8/2002 |

* cited by examiner

Primary Examiner—Nick Corsaro
Assistant Examiner—Nicholas La
(74) Attorney, Agent, or Firm—McGinn IP Law Group, PLLC

(57) ABSTRACT

Information about a past channel connection history accompanying movements of a user is stored in a mobile phone. When a channel is connected with a new base station by turning the power on or by a hand-over, the information about a channel connection history is searched, then one or more cell to which the user may move is predicted, and to those cells, a determination of a hand-over is performed preferentially. Thereby, an increase in power consumption of the mobile terminal is prevented.

22 Claims, 6 Drawing Sheets

FIG. 6

| | BASE STATION NAME | POWER ON |
|---|---|---|
| OLD | BASE STATION D | Y |
| | BASE STATION G | N |
| | BASE STATION J | N |
| | | |
| NEW | | |

FIG. 7

| BASE STATION NAME | NUMBER OF CONNECTION | LATEST UPDATE DATE |
|---|---|---|
| BASE STATION D | 200 | 03Dec2002 |
| BASE STATION G | 155 | 03Dec2002 |
| BASE STATION J | 103 | 03Dec2002 |
| BASE STATION A | 12 | 02Oct2002 |
| BASE STATION C | 1 | 24Apr2002 |

MOBILE TERMINAL AND HAND-OVER SOLVING METHOD

BACKGROUND OF THE INVENTION

1. Field of the Invention

The present invention relates to a mobile terminal incorporating a radio communication controller, and in particular, to a mobile terminal utilizing a so-called hand-over function with which a base station is automatically switched so as to continue communications when a user moves from one cell to another.

2. Related Art

Mobile terminals including mobile phones, when located in the cell of a base station, transmit/receive voices and data with the base station using a radio wave, to thereby perform communications with other mobile terminals or fixed telephones via the base station.

Since mobile terminals are small and light, a user can move while speaking. If the moving range of the user is within the cell of a base station, no problem arises. However, the cell of a base station is invisible, so that there may be a case that the user moves over the cell of a base station into the cell of another base station. In such a case, the communicating condition between the mobile terminal and a base station becomes better with the destination base station than with the source base station. Therefore, it is necessary to change a base station, with which the mobile terminal communicates, to the destination base station. A mobile terminal utilizes a so-called hand-over function with which a base station is switched automatically when a user moves from one cell to another so as to continue communications.

When a new service is provided from a base station to a mobile terminal, a radio wave for the new service uses a higher frequency in order to avoid the existing frequency band. As higher frequency is used, the attenuation factor of the radio wave becomes higher. As such, the cell region of the base station tends to be smaller. This means that as more new services are provided, the number of hand-over increases.

A mobile terminal with a PDC(personal digital cellular) system adopts FDD(frequency division duplication) in which a transmission frequency band and a receiving frequency band are separately existed. Each frequency band is divided into three, and one of them is used as a time slot of the mobile terminal itself. Operations of a mobile terminal include processing of a transmission time slot, processing of a receiving time slot, and processing of time slots other than these. In a time slot where the mobile terminal does not perform transmission/reception, the mobile terminal monitors the strengths of radio waves from other base stations with which no communicating state is established.

If certain condition values are indicated in the radio wave strength from a base station in the communicating state and in the radio wave strength from a base station not in the communicating state, the base station is switched upon request from the mobile terminal.

In a W-CDMA(Wideband CDMA) system, although each base station of the same service provider performs communications with a mobile terminal using the same frequency, each base station is assigned a different scramble code. As obvious from the fact that a control signal for such as starting a measurement is transmitted from the base station to a mobile terminal (downward direction), the base station holds an initiative to control a hand-over. However, actual measurements and announcements to the base station are performed on the mobile terminal side. FIG. 2 shows a sequence, which extracted and translated FIG. 26 of the technical specification TS25.303 of W-CDMA. As seen from this FIG., it is not necessary to reply all measurement results obtained by the terminal as they are. The measurement results are notified from the mobile terminal to the base station according to the independent criteria of the mobile terminal.

Even in either system, there are following problems since all cells of other base stations (destination), adjacent to the cell of the base station (source) (service area cell) with which the mobile terminal is currently connected, are subject to monitoring as hand-over targets.

First, when a terminal side such as PDC monitors surrounding cells, all surrounding cells are subject to monitoring. Therefore, cells of base stations, into which the user has never moved before, are also subject to monitoring. Monitoring of these cells is often just a waste of electric power, which only causes a shortening of the movable time of the mobile terminal.

Second, as the number of monitoring targets increases, the period of time assignable to one monitoring target decreases. Therefore, it is forced to measure in a short period of time, so that a search accuracy is degraded. In particular, since a search cycle is shorter and a radio wave with a higher frequency is used, comparing with those of the PDC system, this problem is remarkable in the W-CDMA system in which a micro-cell or a pico-cell is used as a cell and the number of search targets tends to increase.

In order to solve these problems, there are conventional techniques as described below.

In the technique disclosed in the Japanese Patent Application Laid-open No. 11-075237, a mobile terminal makes a preliminary selection continuously for an adjacent cell satisfying a certain condition. When a hand-over or the like occurs since the strength of the electric field is lowered, the adjacent cell which is a target of the preliminary selection becomes a target of monitoring.

A technique disclosed in the Japanese Patent Application Laid-open No. 2000-209630 applies a different cell search algorithm depending on whether the mobile terminal is in the moving state or in the still state. When in the still state, a base station which has been stored as a hand-over destination by the mobile terminal is set as a target to be preferentially searched, and cell searches are performed to the base station with high frequency than to other base stations. On the other hand, in the moving state, a base station which is adjacent to the base station currently connected is set as a target to be preferentially searched for, and cell searches are performed to the base station with high frequency than to other base stations.

In either technique, an absolute element such as a physical distance is set as the basis for cell searches, as described above. However, this basis is not a basis in which information such as an activity range of a user is reflected. More specifically, in the technique disclosed in the Japanese Patent Application Laid-open No. 11-075237, a basis for determination is a quality of service provided from surrounding base stations by information elements included in a system information message (how many cells are available for GPRS preferable for data transfer). Further, in the technique disclosed in the Japanese Patent Application Laid-open No. 2000-209630, a mobile terminal preferentially sets a cell, which is determined as appropriate by the base station, as a target of a search.

SUMMARY OF THE INVENTION

It is therefore, an object of the present invention to predict, with a consideration of a user's activity, a surrounding cell to which the user may move, and based on the prediction, not to monitor cells in which the probability of hand-over is low, to thereby improve a communication quality.

In order to achieve the object, the present invention accumulates a history of hand-over for continuing communications by switching a base station when a user moves from one cell to another, and based on the history data of hand-over, predicts a base station to which the user may move as a base station requiring a hand-over request.

The "history of hand-over" may include the number of hand-overs and the latest update time for each base station. Further, the "history of hand-over" may be managed by an LRU (least recently used) algorithm.

Further, it is also possible to perform a hand-over considering the number of hand-over being performed to each base station, or to preferentially perform a hand-over to a base station in which the number of hand-over being performed is larger than a threshold.

Further, it is also possible to determine, based on receiving electric power, a SIR(signal interference wave output ratio) or a BER (bit error rate), the state in which the communicating condition with the base station predicted as a hand-over target deteriorates.

The present invention is capable of performing the aforementioned process as a device or a method.

BRIEF DESCRIPTION OF THE DRAWINGS

FIG. 6 is a schematic diagram showing a method of storing the hand-over history of a base station; and FIG. 7 is a schematic diagram showing another method of storing the hand-over history of a base station.

PREFERRED EMBODIMENT OF THE INVENTION

Figure 3:
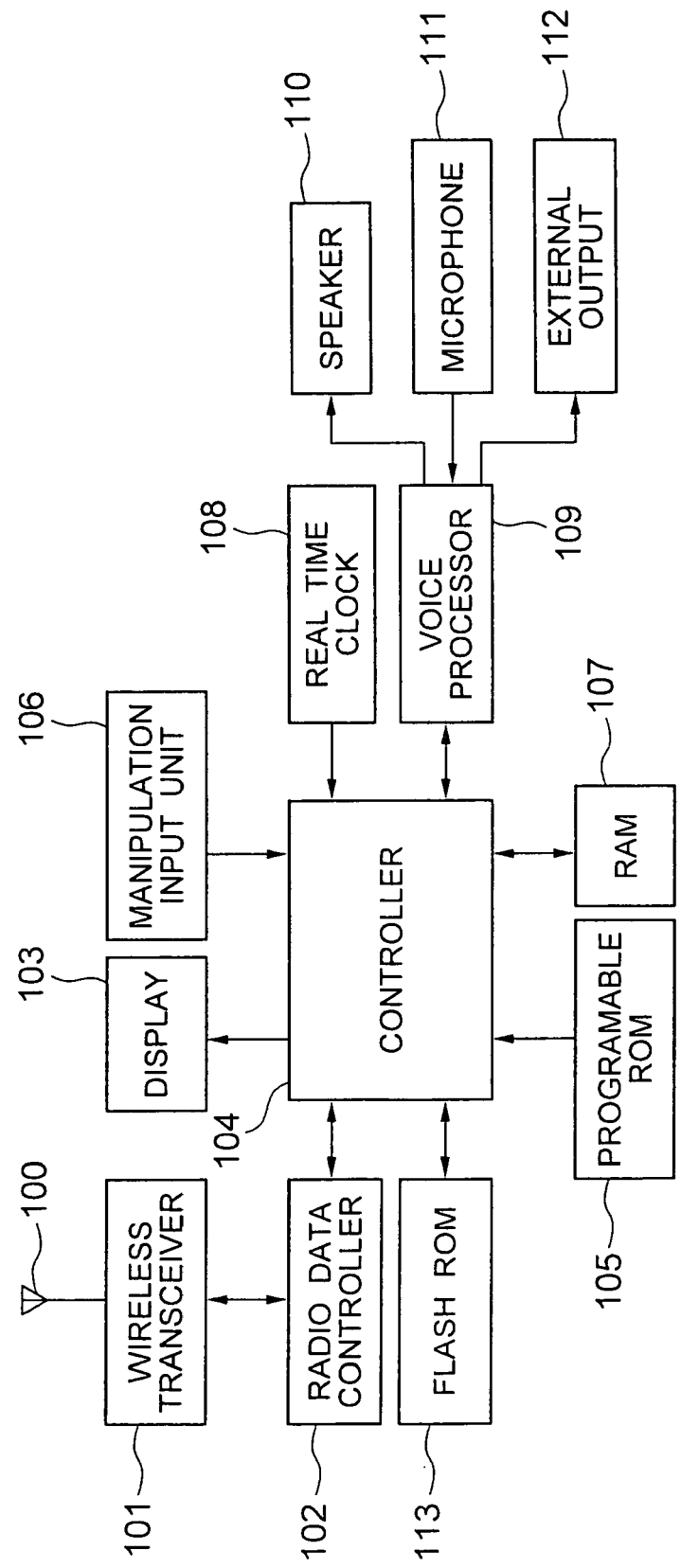
FIG. 3 is a block diagram showing the structure of a mobile phone according to the present invention.

As shown in FIG. 3, the main body of a mobile phone according to the present invention comprises, a radio transceiver 101, a radio data controller 102, a display 103, a manipulation input unit 106, a speaker 110, an external output terminal 112, a microphone 111, a voice processor 109, and a main controller 104.

The radio transceiver 101 performs transmission and reception with base stations using the antenna 100. The radio data controller 102 controls the radio transceiver 101, and modulates data to be transmitted to a base station and demodulates data received from a base station. The display 103 displays status of the mobile phone. The manipulation input unit 106 is provided with plural keys with which the user manipulates the mobile phone. The speaker 110 outputs voice data received from a base station as voice information to the user. The external output terminal 112 outputs information held by the mobile phone to the outside. The microphone 111 converts voice information of the user into voice data. The voice processor 109 performs an analog/digital conversion or a digital/analog conversion of input/output voices to the speaker 110, the microphone 111 and the external output terminal 112. The main controller 104 controls the operation of each component described above by reading out codes in a program ROM 105 and by using a RAM 107 as a working area. The main controller 104 performs the aforementioned operational control based on a synchronizing clock from a real time clock 108. Further, the main controller 104 protects data required to be kept even after the power turned off, by evacuating it on a nonvolatile flash ROM 113.

Figure 4:
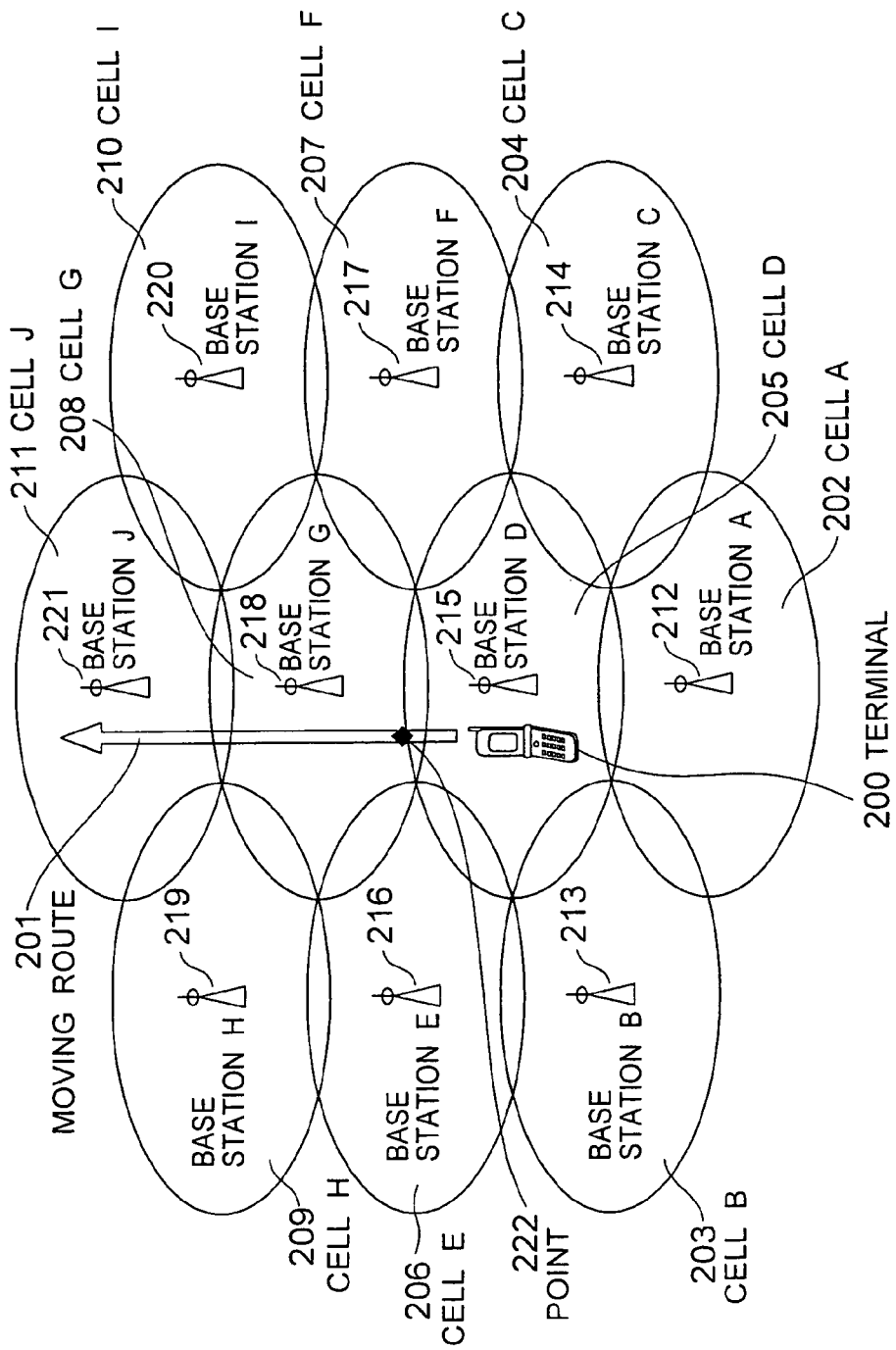
FIG. 4 is a diagram showing an arrangement of base stations of a mobile phone network according to the present invention.

As shown in FIG. 4, cells A 202 through J 211 of multiple base stations A 212 through J 221 are arranged so as to overlap one another in some portions. FIG. 4 shows a case in which a user moves from a base station 215 as a starting point toward another cell A 202, B 203, C 204, E 206, F 207, G 208, H 209, 1210 or J 211 of a base station A 212, B 213, C 214, E 216, F 217, G 218, H 219, 1220, or J 221. In order to simplify the explanation, a case that a user is expected to move along a moving route 201 in FIG. 4 will be described first. Processing of a hand-over in a conventional PDC system, in the case of moving along the moving route 201 in FIG. 4, will be described based on FIG. 1.

In FIG. 4, the user is assumed to stay at the cell D 205 of the base station 215 initially, with a mobile phone 200 at hand.

When the user is located in the cell D 205 of the base station D 215, the strength of receiving power that the mobile phone 200 receives from the base station D 215 is assumed to be Pd, and the strength of receiving power that the mobile phone 200 receives from the adjacent base station A 212 is assumed to be Pa. In the following conventional example, cases where a subscription b, c, e, f, g, h, i or j is added to the reference symbol Pd show the strength of receiving power corresponding to the base station B, C, E, F, G, H, I or J, respectively.

First, the mobile phone 200 searches for a frequency receivable at a place where it is currently located, checks from which base station it can receive the strongest receiving power, and then establishes a channel with the base station from which it receives the strongest receiving power.

In the PDC system, although a portion of the cell of a base station and a portion of the cell of another base station overlap, there is no case that a cell completely incorporates another. Thus, initial searching targets in this FIG. are, besides the receiving power from the base station D 215 where the user is located, receiving power Pda, Pdb, Pdc, Pde, Pdf and Pdg from the base stations A 212, B 213, C 214, E 216, F 217, and G 218. The mobile phone 200 checks the receiving power with reference to all of these (S302, S304, S305). It should be noted that although the strength of the receiving power Pda, Pdb, Pdg are exemplary shown in FIG. 1, the mobile phone 200 also checks the strength of other receiving power Pdc, Pde, Pdf, Pdh, Pdi, and Pdj, and collects data for performing a hand-over.

In the PDC system, frequencies from all adjacent base stations are different, respectively. Therefore, the mobile phone 200 discriminates the base station based on the difference of the frequency. In the initial state shown in FIG. 4, the strength of the receiving power of the radio wave from the base station D 215, where the user is located, is the highest, so that a wireless channel is established with the base station D 215 (S305: Yes).

As the user moves and the mobile phone 200 approaches the cell G 208 adjacent to the cell D 205, the values of the receiving power strength Pd and Pdg come close. Further, when the user passes through the overlapping portion of the cell G 208 and the cell D 205 so as to move into the cell G 208, the values of the receiving power strength Pd and Pdg from the two base stations are reversed (S305: No). Here, it is determined that the conditions for a hand-over are satisfied and the base station D 215 performs a hand-over from the base station D 215 to the base station G 218 (S308).

Figure 1:
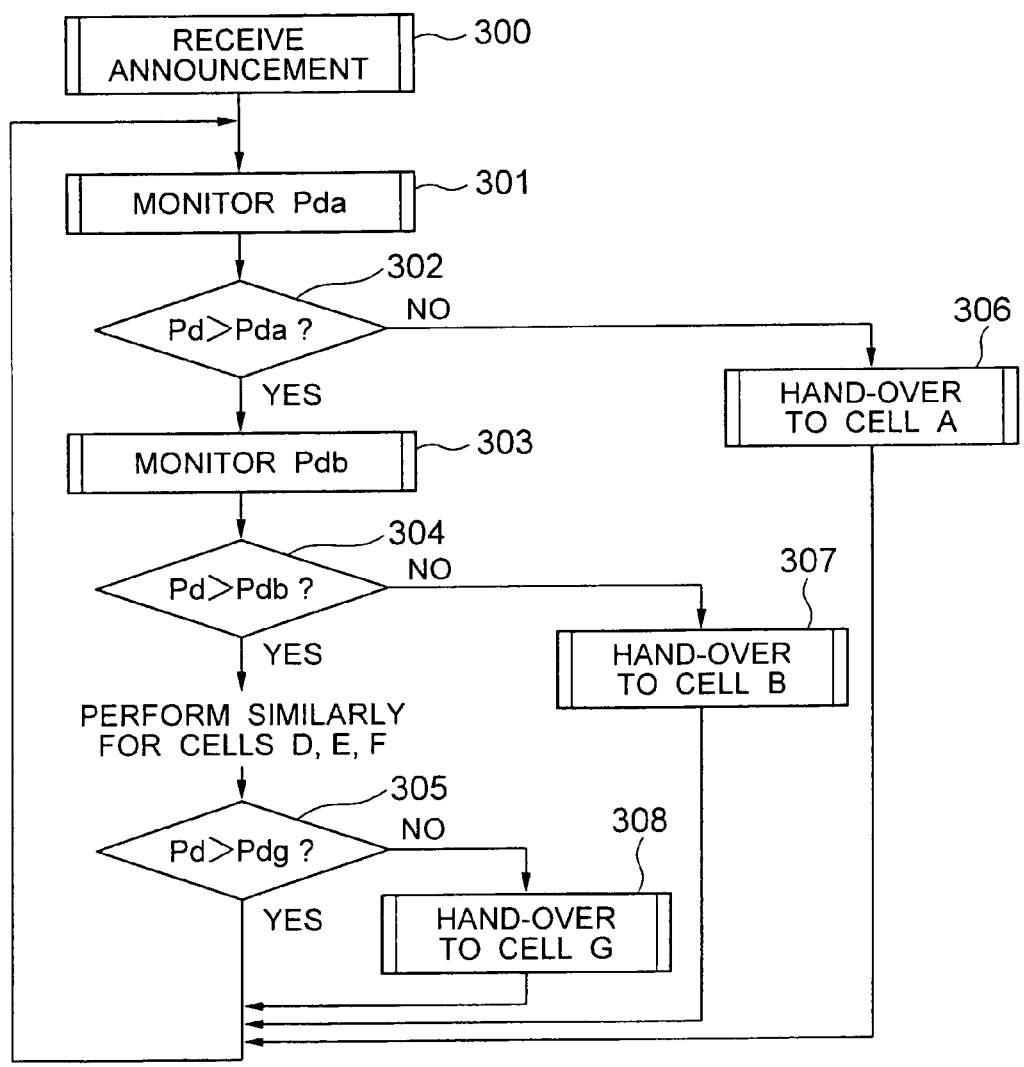
FIG. 1 is a flowchart showing the procedure of a conventional hand-over.
Figure 2:
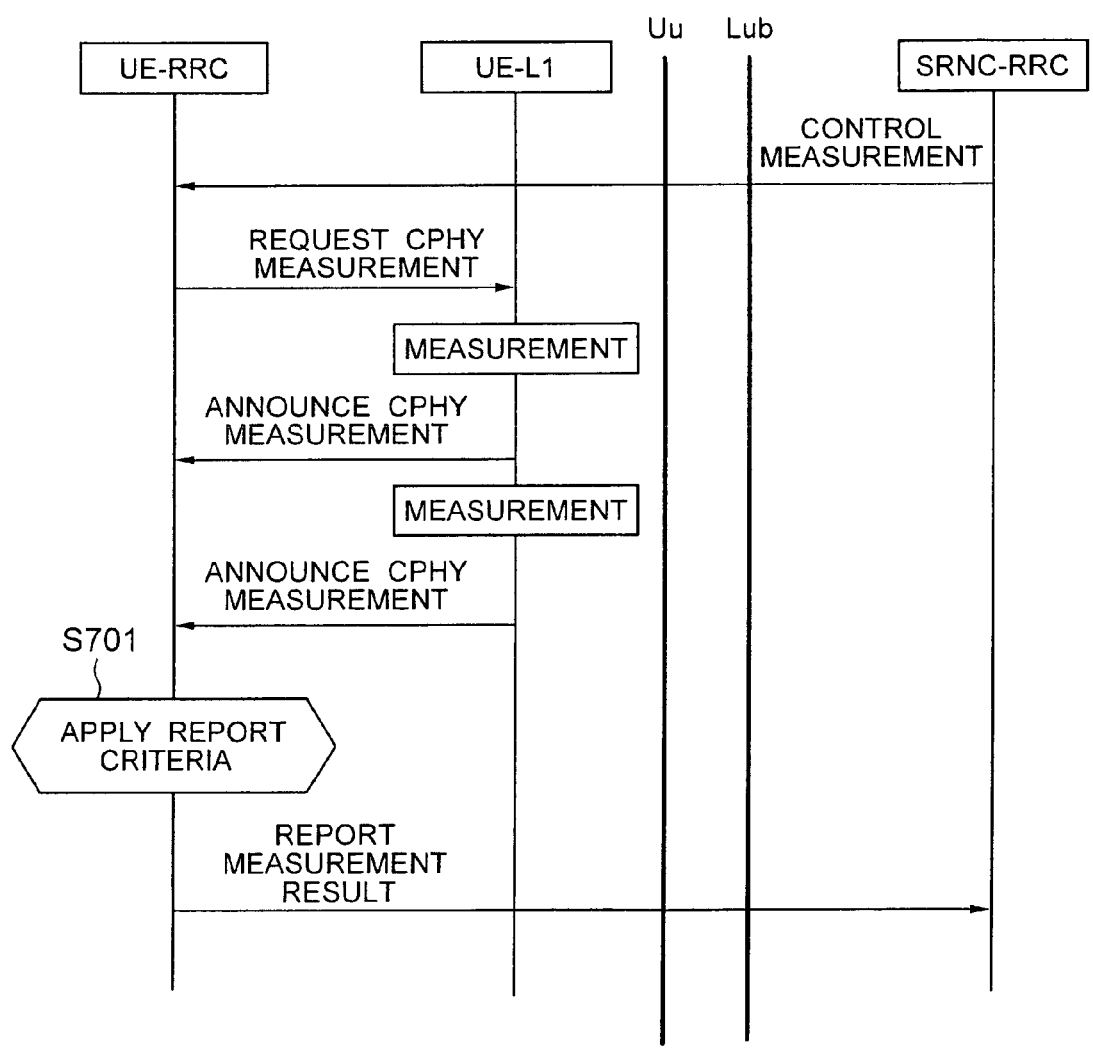
FIG. 2 is a chart showing a checking procedure of a hand-over in the W-CDAM system.

The aforementioned document may be read that at the time of the hand-over from the base station D 215 to the base station G 218, only the cell G 208 of the base station G 218 is checked. However, all cells surrounding the cell D 205, which is the initial service area cell, are checked to determine whether a hand-over should be made to each of the cells, as shown in FIG. 1. This is because the conventional technique shown in FIG. 1 does not have historical data from which a movement of the user can be predicted. Therefore, the mobile phone carried by the user must monitor all cells, that is, all cells surrounding the base station D 215 in the case shown in FIG. 4, so as to identify a destination cell to which the user moves. The historical data corresponds to data of the moving route 201 in the case of FIG. 4.

Now, in a case that a user moves to multiple cells of base stations at random, it is almost impossible to predict the destinations of the user. However, there may be a case that destinations of the user moving multiple cells can be predicted. Such a prediction is possible when the user moves according to a certain rule. For example, when a user moves to a station to go to work, when a user moves to a specific destination taking a route bus or a train, when a user moves to a specific destination using a main channel, or the like, the movement of the user can be predicted with a certain probability.

As obvious from the aforementioned examples, it is possible to predict a movement of a user if the movement of the user has a certain rule.

The present invention is characterized in that a check for a hand-over is performed based on a rule indicated by the movement of a user. Next, using a history of order of channels being established for each base station along with the movement of the user, or a history of the number of channels being established for each base station along with a hand-over, as a rule indicated by the movement of the user, an example of performing a check for a hand-over according to the movement of the user will be described below, based on the history. Note that rules indicated by the movement of a user are not limited to the aforementioned examples using the histories.

The history data indicating a rule of the movement of a user, as described above, is recorded on the RAM 107 by the main controller 104, and is stored on the flash ROM 113 when the power of the mobile phone 200 is turned off. An embodiment of the present invention will be explained with reference to FIGS. 5 to 7.

FIG. 6 shows an example in which a base station to which a user may move is predicted based on history data of the number of channels being established for respective base stations along with the movements of the user, then a check for a hand-over is performed.

It is assumed that the user is located within the cell D 205 of the base station D 215 and the mobile phone 200 carried by the user is in the state of establishing a channel with the base station D 215 in the cell D 205.

When the user is located within the cell D 205 of the base station D 215, the main controller 104 of the mobile phone 200 predicts a base station to which the user may move. That is, the main controller 104 searches whether the history data of the number of channels being established for respective base station along with the hand-over exists on the RAM 107 or on the flash ROM 113.

If the main controller 104 finds the history data on the RAM 107 or on the flash ROM 113, then confirms whether, in the history data found, there is history data showing that the user has moved from the cell D 205, with which the channel is currently established, to the next cell (S401). Upon confirmation, the main controller 104 predicts and identifies a cell to which the user may move. This processing is proceeded as follows.

First, the main controller 104 searches for a history about the "base station D" in the items of base station names in the history information shown in FIG. 6.

If there is no history about the base station D, it is considered that the user moved into the cell D (205) of the base station D (215) for the first time. In this case, since there is no history data for predicting the movement of the user in the state of the user staying at the cell D 205 of the base station D 215 and communicating with the base station, it is impossible to identify a cell to which the user may move. Therefore, the main controller 104 so processes that a cell to which the user may move cannot be identified in this stage (S401, NO). Even in this case, it is possible to specify a cell to which the user may move, based on information of the next base station to which the user has moved.

Next, if there is a history about the "base station D" in the history data shown in FIG. 6, the main controller 104 checks whether the "power-on" field following the "base station" field is Yes or No.

If the "power-on" field indicates No, the base station was registered by a hand-over. Therefore, the main controller 104 determines that the user has moved to the base station D 215 in the past since the "power-on" field indicates No, and identifies the base station D 215 as one of cells to which the user may move. Then, this is included in the history data.

If the "power-on" field indicates Yes, it means as follows. That is, the user was located at the cell D 205 of the base station D 215. The power of the mobile phone 200 was turned on within the cell D 205, and the mobile phone 200 established a wireless channel with the base station D 215. Since this history was registered through a cell search by turning on the power, the main controller 104 has no relation with a hand-over, so that it is determined that this is not the cell to which the user may move.

Now, an explanation will be given for a series of processes described above referring to FIG. 5. The history data of the "base station D" exists as the oldest history data, so the "power-on" field for the history data of the subsequent "base station G" is to be checked. Since this field indicates "No", the main controller 104 predicts (identifies) a cell G 208 of the base station G 218 as a cell to which the user may move.

When the main controller 104 predicts, as a cell to which the user may move from the base station D 215, cells of other base stations in addition to the aforementioned cell G 208 of the base station G 218, the following process is performed. In this processing, the main controller 104 receives an annunciation transmitted from the base station D 215 to the mobile phone 200. Upon receipt of the annunciation, the main controller 104 compares the annunciation with data in the RAM 107, and confirms whether the code of the predicted cell is in the annunciation. The code of the predicted cell may be included in the annunciation of FIG.

5 and transmitted to the mobile phone. In the explanation below, the code of the predicted cell G 208 is assumed to be in the annunciation.

If predicted cell information, for example, information about only the predicted cell G 208, exists in the annunciation, only the strength Pdg of the receiving power from the base station G 218, to which the user may move, is monitored (S403). If there is information about two or more predicted cells in the annunciation, the receiving power is monitored in turn for each of the base stations corresponding to the two or more predicted cells. If there is no information about a predicted cell in the annunciation, all surrounding cells received by the annunciation are monitored (S408). The surrounding cells received in the annunciation mean cells that are close in distance from the base station currently connected and are preferentially set as targets of searching. The strengths of the receiving power from the base stations having these cells are monitored.

When, as the mobile phone 200 moves along the route 201, the strength Pdg of the receiving power from the base station G 218 of the predicted cell becomes larger than the strength Pd of the receiving power from the base station D 205 which is the cell of the service area (S404), the mobile phone 200 transmits a hand-over request to the base station D 215 based on the control of the main controller 104. The base station D 215 determines whether the request from the mobile phone 200 includes a hand-over, and performs the hand-over if necessary (S405). When the base station D 215 performs the hand-over, the main controller 104 of the mobile phone 200 records information about the base station D 215, which has performed the hand-over, in the RAM 107 (S406). Here, "No" is recorded in the "power-on" field".

In the aforementioned explanation, it is premised that the moving route 201 has set beforehand and the user moves along the moving route 201. However, the user does not always move in a direction to the cell G 208 of the base station G 218. The user may, by some reasons, move to a direction other than the cell G 208 of the base station G 218. An explanation will also be given for this case.

In FIG. 4, when the user moves from the cell D 205 of the base station D 215 to the cell A 202 of the base station A 212, the strength Pdg of the receiving power from the base station G 218, which is monitored since the user may move to, is changed to be lowered.

When the strength Pdg of the receiving power from the base station G 218 monitored becomes lower than a threshold, the main controller 104 of the mobile phone 200 determines that the user takes a movement different from the normal one. Then, the target of monitoring the strength of receiving power from a base station is changed to all surrounding cells included in the announcement from the base station D 215. Note here that the threshold is set so as to secure the communication quality between a base station and the mobile phone. The surrounding cells include the base station A 212, the base station B 213, the base station C 214, the base station E 216, the base station F 217, and the base station G 218, which are close in distance from the base station D 215 and are preferentially set as monitoring targets. These base stations are limited to those surrounding the base station D which is the source of the movement, and close in distance from the base station D 215. This point differs from the conventional technique.

The main controller of the mobile phone 200 compares the strength of the receiving power Pdg from the base station G 218 predicted as the destination with the strengths of the receiving power Pa, Pb through Pf from the rest of the base stations A 202, B213 through F217.

Figure 5:
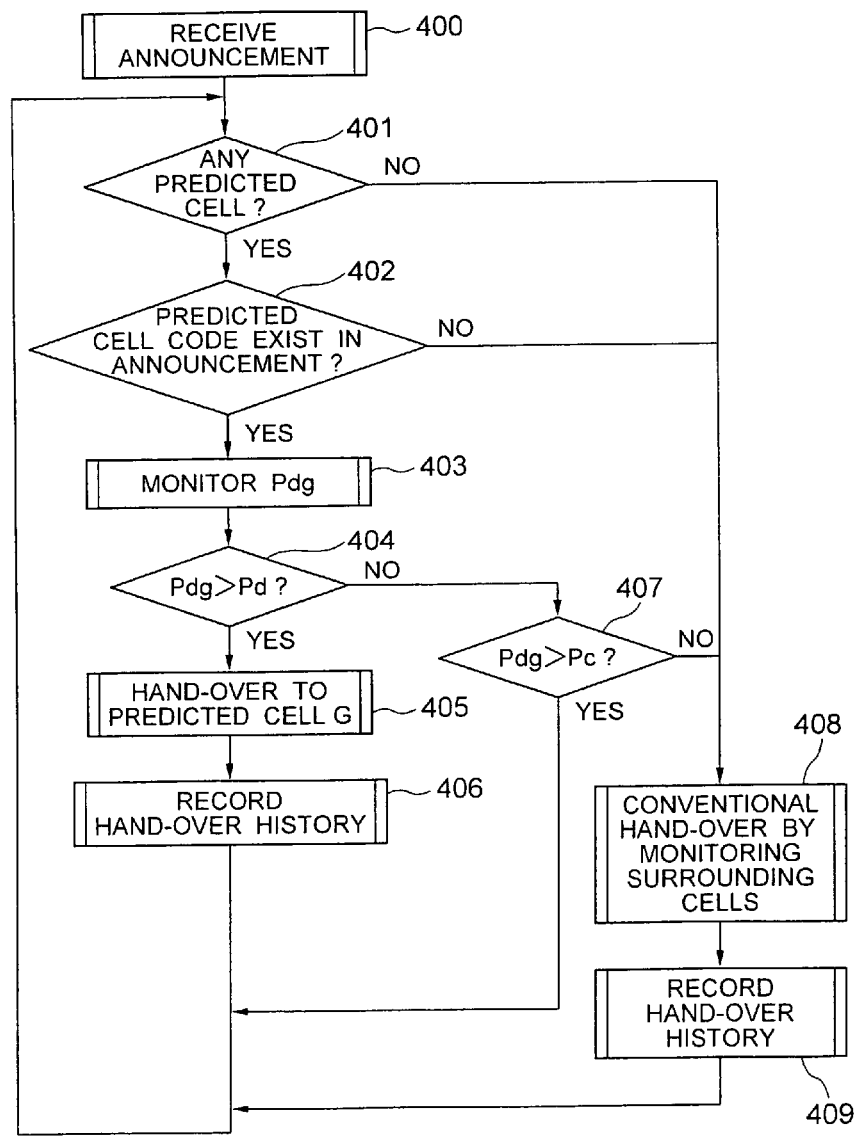
FIG. 5 is a flowchart showing the procedure of a hand-over according to the present invention.

FIG. 5 shows a case of comparing the strength of the receiving power Pc from the base station C 214 with the strength of the receiving power Pdg from the base station G 218 predicted as the destination of the user. Here, the user moves to the cell C 204 of the base station C 214, away from the G 208 of the base station G 218 which is predicted as the destination by the mobile. Thus, the strength of the receiving power Pc from the base station C 214, to which the user is actually approaching, gradually increases comparing with the strength of the receiving power Pdg from the base station G 218 (S407, No).

In a case of the user moving to the base station C 214, history data which should predict the movement of the user is not stored on the RAM 107 of the mobile phone 200. Thus, the main controller 104 of the mobile phone 200 monitors based on information, about cells close in distance from the source base station, included in the announcement from the base station, and determines whether the request of hand-over is necessary or not (S408).

Also in this process, in order to predict the destination of the user, the main controller 104 of the mobile phone 200 records in the RAM 107 information about the base station performing the hand-over (S409).

Although the hand-over is performed by monitoring the strengths of the receiving power from base stations in the above explanation, it is not necessary to use the strength of the receiving power as a trigger. Instead of the strength of the receiving power, a SIR(signal interference wave output ration) or a BER(bit error rate) may be used to perform a hand-over.

Further, there may be a case that history information for predicting the destination of the user is not stored on the RAM 107 of the mobile phone since, for example, the mobile phone has just been bought, or predicted cells are not stored on the RAM 107 since the user has never moved. In such a case, the present invention monitors, based on data of the surrounding cells included in an announcement from a base station, the strengths of the receiving power from the base stations having these cells, and based on the monitoring result, registers the base station (S408). Also in this case, the main controller 104 records information about the base station performing the hand-over in the RAM 107 (S409).

In the above explanation, the condition for monitoring the surrounding cells according to the information about the surrounding cells is determined by the strength of the receiving power Pdg from the base station. However, in a case that the strength of the receiving power Pdg is smaller than the threshold but the varying range of the strength of the receiving power Pd is set within a certain range without any rapid attenuation, it is assumed that a movement to the outside of the service area cell is not likely, so that unnecessary cell searches are not performed by not transferring to monitoring of the surrounding cells. This can reduce power consumption. The threshold value is set so as to secure the communication quality between the base station and the mobile phone.

Further, in a case that the user moves in a direction to the cell F 207 of the base station F 217 while connecting a channel with the base station D 215, the strength Pdg of the receiving power from the base station G 218 predicted as the destination of the user will not change a lot, if the distant from the base station D 215 to the base station G 218 and the distant from the base station D 215 to the base station F 217 are almost the same. Only the value of Pd of the source base station D 215 shows a dropping tendency.

In this case, it is difficult to predict to which of the base station G 218 or the base station F 217 the user moves, away from the base station D 215. Here, by setting the strengths of the receiving power from the surrounding cells as monitoring targets, in particular, Pdg and Pf from the base station G 218 and the base station F 217, and monitoring the changes in the strengths Pdg and Pf of the receiving power, either the base station G 218 or the base station F 217 is selected, then the hand-over request is determined whether it is required or not (S408).

FIG. 6 is a schematic diagram showing history information at the time of recording in the RAM 107 only information about the base station which performed hand-over at the time of the hand-over as described above. Items of histories to be recorded include a power-on field indicating whether a base station establishing a channel and the establishment relate to a cell search performed when the power was turned on. Next, an explanation will be given for what kind of and how data is recorded in FIG. 6, by each step of FIG. 4.

Upon an operation of turning on the power of the mobile phone 200 not shown in FIG. 4, the mobile phone 200 performs a cell search related to a location registering operation, and checks to which base station the mobile phone belongs. In FIG. 5, assuming that the power is turned on within the cell D 205, the name of the base station D 215 and the fact that the registration is caused by turning the power on are recorded in the latest item of the history. The main controller 104 records in the RAM 107 whether the power is turned on or not. Therefore, there is an advantage that no history information having no consistency is stored in the event that, for example, the mobile phone has been moved along with the user while the power is turned off, and it is turned on again at a place distant from the cell which was finally registered.

Next, in the step S405 in FIG. 5, the base station G 218 is registered in the latest item of the history when a hand-over from the base station D 215 to the base station G 218 is performed. At this time, it is registered that this is not caused by turning the power on, in the RAM 107. Thus, a hand-over from the base station D 215 to the base station G 218 is recorded. Similarly, if the user moves to the cell J 211, the fact that the movement to the base station J 221 is not caused by turning the power on is also registered in the latest history information. By registering from time to time as aforementioned, an area for storing the history information allocated to the RAM 107 becomes full at last. Then, the oldest one (in FIG. 6, data related"to the "base station D" on the top row) is deleted so as to record a new one.

In the present system, a subsequent cell in the history is set as a candidate for a predicted cell, by searching for the name of the base station currently connecting the channel in the history. Therefore, it is advantageous that even an adjacent cell recorded can be eliminated from candidates for a predicted cell. For example, if it is the user's custom to move from the cell D 205 in FIG. 4 to the cell E 206 via the cell G 208, this information is recorded as a history, and when the user moves into the cell D 205 next time, it is possible not to check the cell E 206 and only check the cell G 208. Therefore, the power consumption of the mobile phone 200 can be reduced.

It should be noted that the structure of each history is not limited to the aforementioned. For example, there may be no power-on field, or there may be other items.

In another case, it may be desired to secure the available capacity of the memory, although tracking of the moving path is not so required. In the history management method in the system shown in FIG. 6, a base station is registered as one item at each time it is passed, although some base stations may be frequently passed. Thus, it cannot be said that the storage area is effectively utilized. FIG. 7 is a schematic diagram showing a storing system of history, which solves this problem. Explanation will be given for a case using this method for recording history information. In this system, the recording items of the history information are a base station name, number of connections, and the latest update date. Further, the same base station name will not appear for multiple times in the history information, and is always managed by one information, which differs from the method for recording history information in FIG. 6. Further, this system does not change processing regardless of a channel being established by turning the power on or by a hand-over.

In the case of the power being turned on within the cell D 205 as shown in FIG. 5, a cell search relating to a location registering operation is performed, and once a channel is connected with the base station D 215, the number of connection relating to the base station D is increased for one, so that the information about the latest update date is updated. Similarly, when a hand-over to the base station G 218 is performed, the number of connection relating to the base station G is increased for one regardless of the fact that the main controller 104 receives a hand-over from any cell adjacent to the cell G 208, and the information about the latest update date is updated.

If the number of registered base stations reaches a certain number and the memory (RAM 107) for registering the history is out of capacity space, the main controller 104, when registering the next, new base station data, refers to the latest update date and uses an LRU algorithm for deleting the item having the oldest, latest update date, which makes it possible to register the new history of the base station.

Further, the present system is capable of not increasing the monitoring targets inadvertently, since a base station is set as a monitoring target after the number of hand-over to it reaches a certain number. For example, if the determination basis of a monitoring target is set to be twenty times or more, the base station D, the base station G, and the base station J may be set as monitoring targets preferentially, but the base station A and the base station C must not be set as monitoring targets.

Although the case of PDC system is described in the above explanation, the case of W-CDMA system is basically the same. However, there are some minor differences in its practice. For example, the same frequency is used for each base station, an identification of base station is performed by a difference in scrambling codes, an initiative for a hand-over is taken by a base station, it is possible to include a pico-cell in a micro cell, and the like. In practice, however, the mobile phone 200 monitors the state of a cell, and it is possible to identify the monitoring target on the mobile terminal side (S701). Accordingly, it is also possible to apply a limitation to monitoring targets.

It should be noted that even when the power of the mobile phone is turned off, the history information about the hand-over described above is desirable to be stored. Therefore, it is preferable that data on the flash ROM 113 be copied onto the RAM 107 when the power is turned on, and adding processing of the history be performed on the RAM 107, and when the power is turned off, the history information on the RAM 107 be copied onto the flash ROM 113 beforehand. Although a mobile phone is used as a mobile terminal, another device than a mobile phone may be used as a mobile terminal.

(Effect)

As described above, the present invention is capable of predicting a destination of a hand-over from the cell of a service area, based on the past hand-over history. Therefore, monitoring of the surrounding cells can be limited to predicted cells to which a hand-over may be performed. As such, cells to which a hand-over is less likely to be performed are not monitored. This improves accuracy for searching surrounding cells, so that the communication quality is also improved.

What is claimed is:

1. A mobile terminal, comprising:
   a memory for storing history data of cells in which the mobile terminal has operated, including an indication of whether the mobile terminal entered the cell by powering on;
   a processor for searching the stored history to locate cells, other than a cell in which the mobile terminal is presently operating, in which the mobile terminal operated in the past but in which the mobile terminal did not power on,
   wherein when the processor detects in the stored history a cell in which the mobile terminal did not power on and which has the oldest history, the processor predicts that the mobile terminal will move into the detected cell.

2. The mobile terminal, as claimed in claim 1, wherein the processor updates the history data of hand-over using a least recently used algorithm.

3. The mobile terminal, as claimed in claim 1, wherein when a communicating condition within a cell in which the mobile terminal is currently operating deteriorates, the processor causes operation of the mobile terminal to be handed over to a base station of the detected cell.

4. The mobile terminal, as claimed in claim 3, wherein the processor determines the deterioration in the communicating condition based on a change in a strength of received electric power from the base station.

5. The mobile terminal, as claimed in claim 3, wherein the processor determines the deterioration in the communicating condition based on a change in a signal interference wave output ratio from the base station.

6. A mobile terminal, comprising:
   a memory for storing history data of cells in which the mobile terminal has operated, including an indication of whether the mobile terminal entered the cell by powering on;
   a processor for searching the stored history to locate cells, other than a cell in which the mobile terminal is presently operating, in which the mobile terminal operated in the past but in which the mobile terminal did not power on,
   wherein when the processor detects in the stored history a cell in which the mobile terminal did not power on and which the mobile terminal operated the greatest number of times in the past, the processor predicts that the mobile terminal will move into the detected cell.

7. The mobile terminal, as claimed in claim 6, wherein the processor updates the history data of hand-over using a least recently used algorithm.

8. The mobile terminal, as claimed in claim 6, wherein when a communicating condition within a cell in which the mobile terminal is currently operating deteriorates, the processor causes operation of the mobile terminal to be handed over to a base station of the detected cell.

9. The mobile terminal, as claimed in claim 8, wherein the processor determines the deterioration in the communicating condition based on a change in a strength of receiving electric power from the base station.

10. The mobile terminal, as claimed in claim 8, wherein the processor determines the deterioration in the communicating condition based on a change in a signal interference wave output ratio from the base station.

11. The mobile terminal, as claimed in claim 8, wherein the processor determines the deterioration in the communicating condition based on a change in an error rate from the base station.

12. A hand-over solving method for a mobile terminal, said method comprising:
    operating the mobile terminal within a cell of a base station;
    storing history data of cells in which the mobile terminal has operated, including an indication of whether the mobile terminal entered the cell by powering on;
    searching the stored history to locate cells, other than the cell in which the mobile terminal is presently operating, in which the mobile terminal operated in the past but in which the mobile terminal did not power on;
    detecting in the stored history a cell in which the mobile terminal did not power on and which has the oldest history; and
    predicting that the mobile terminal will move into the detected cell.

13. The hand-over solving method for a mobile terminal, as claimed in claim 12, further comprising updating the history data of hand-over using a least recently used algorithm.

14. The hand-over solving method for a mobile terminal, as claimed in claim 12, further comprising when a communicating condition within the cell in which the mobile terminal is currently operating deteriorates, handing over operation of the mobile terminal to a base station of the detected cell.

15. The hand-over solving method for a mobile terminal, as claimed in claim 14, wherein the deterioration in the communicating condition is determined based on a change in a strength of received electric power from the base station.

16. The hand-over solving method for a mobile terminal, as claimed in claim 14, wherein the deterioration in the communicating condition is determined based on a change in a signal interference wave output ratio from the base station.

17. A hand-over solving method for a mobile terminal, said method comprising:
    operating the mobile terminal within a cell of a base station;
    storing history data of cells in which the mobile terminal has operated, including an indication of whether the mobile terminal entered the cell by powering on;
    searching the stored history to locate cells, other than the cell in which the mobile terminal is presently operating, in which the mobile terminal operated in the past but in which the mobile terminal did not power on;
    detecting in the stored history a cell in which the mobile terminal did not power on and in which the mobile terminal operated the greatest number of times in the past; and
    predicting that the mobile terminal will move into the detected cell.

18. The hand-over solving method for a mobile terminal, as claimed in claim 17, further comprising updating the history data of hand-over using a least recently used algorithm.

19. The hand-over solving method for a mobile terminal, as claimed in claim 17, further comprising when a communicating condition within the cell in which the mobile terminal is currently operating deteriorates, handing over operation of the mobile terminal to a base station of the detected cell.

20. The hand-over solving method for a mobile terminal, as claimed in claim 19, wherein the deterioration in the communicating condition is determined based on a change in a strength of received electric power from the base station.

21. The hand-over solving method for a mobile terminal, as claimed in claim 19, wherein the deterioration in the communicating condition is determined based on a change in a signal interference wave output ratio from the base station.

22. The hand-over solving method for a mobile terminal, as claimed in claim 19, wherein the deterioration in the communicating condition is determined based on a change in an error rate from the base station.

* * * * *